March 10, 1925.                        1,529,117
G. CAPPELLETTI
DRIER
Filed April 23, 1923        2 Sheets-Sheet 1
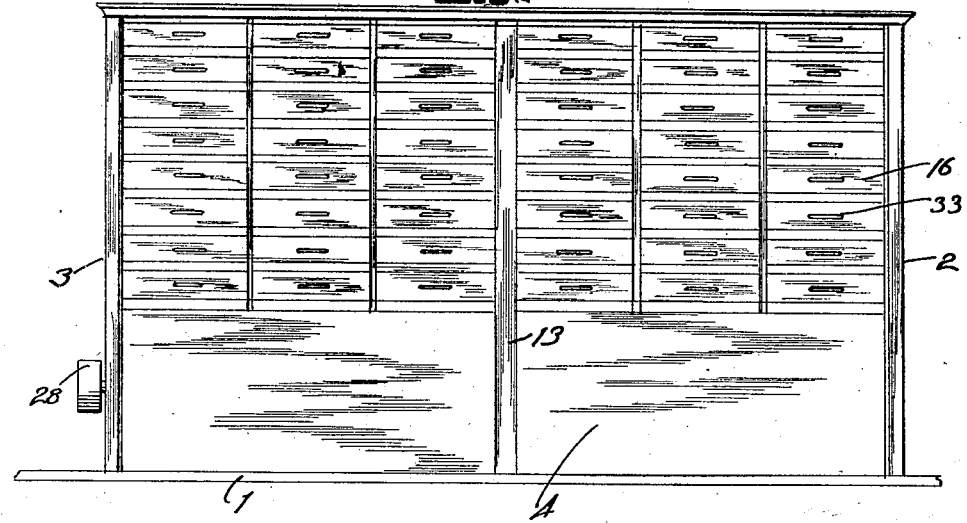
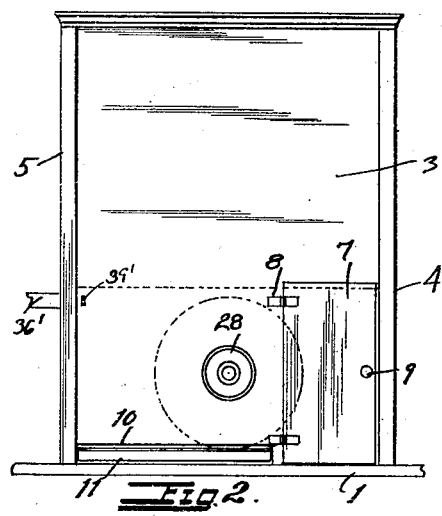
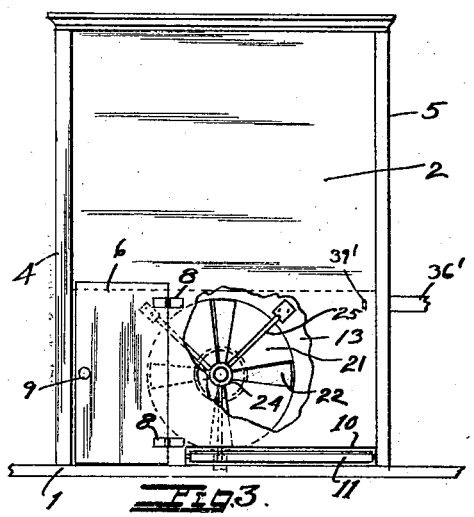
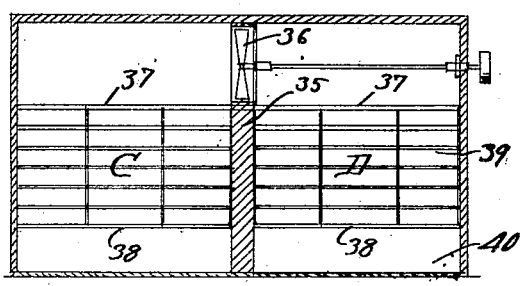
INVENTOR
G. Cappelletti
Carlos P. Griffin
ATTORNEY March 10, 1925.                                                          1,529,117
                            G. CAPPELLETTI
                                DRIER
                        Filed April 23, 1923        2 Sheets-Sheet 2
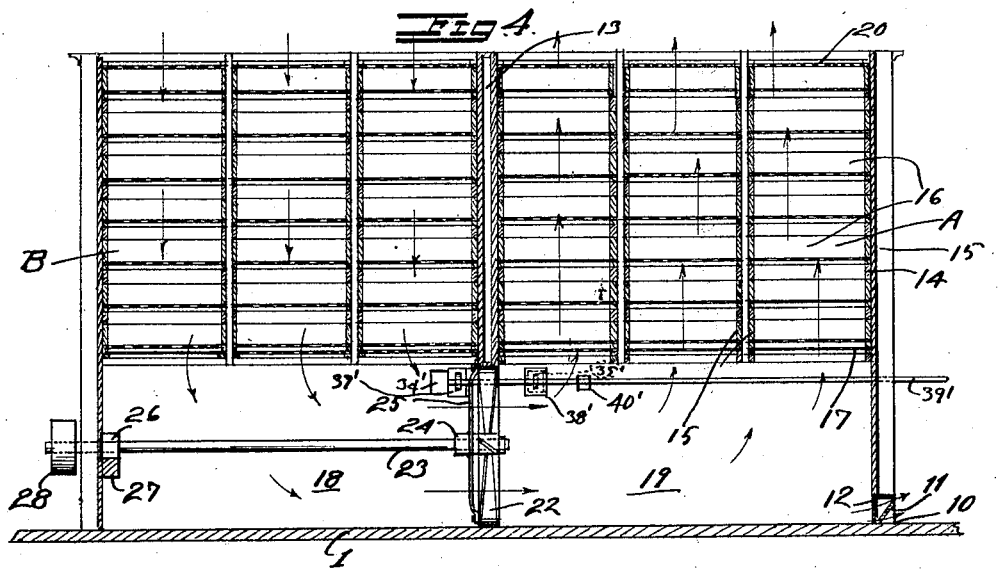
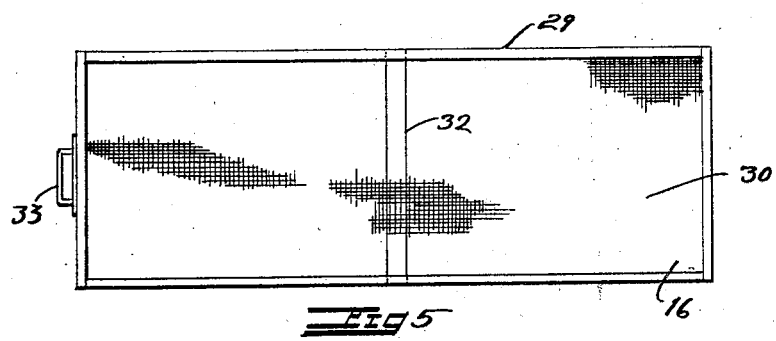
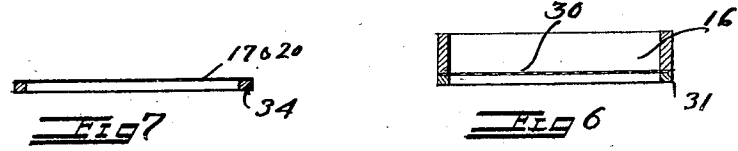
INVENTOR
G. Cappelletti
Carlos P. Griffin
ATTORNEY Patented Mar. 10, 1925.

1,529,117

UNITED STATES PATENT OFFICE.

GIOVANNI CAPPELLETTI, OF SAN FRANCISCO, CALIFORNIA, ASSIGNOR TO MILAN CARPENTER SHOP, A COPARTNERSHIP CONSISTING OF GIOVANNI CAPPELLETTI, GIUSEPPE BAGNANI, AND DANIELE CAPPELLETTI, ALL OF SAN FRANCISCO, CALIFORNIA.

DRIER.

Application filed April 23, 1923. Serial No. 633,842.

*To all whom it may concern:*

Be it known that I, GIOVANNI CAPPELLETTI, a citizen of the United States, residing at San Francisco, in the county of San Francisco, State of California, have invented a new and useful Drier, of which the following is a specification in such full and clear terms as will enable those skilled in the art to construct and use the same.

This invention relates to drier for cereal pastes, such as macaroni, spaghetti and the like, and is particularly adapted for drying short lengths of macaroni, and one of the objects of the invention is to provide a uniform circulation of air through the macaroni.

Another object of the invention is to provide screens inclosing the macaroni while drying and means for readily cleaning the screens.

Another object is to provide a drier that can be filled or emptied quickly.

Another object is to provide means for circulating air through the macaroni first in one direction, then in another.

Another object is the use of screens in the diffusion of air through the drier.

While this machine is especially adapted to dry macaroni it is evident that it may be used to dry a considerable number of other products such as vegetables, meat and other products containing an excess of moisture.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a front elevation of the drier,

Fig. 2 is a side elevation looking from the left of Fig. 1,

Fig. 3 is a side elevation looking from the right of Fig. 1,

Fig. 4 is a longitudinal vertical section of the drier,

Fig. 5 is a plan of one of the trays,

Fig. 6 is a section of one of the trays,

Fig. 7 is a section of one of the top and bottom enclosing screens.

Fig. 8 is a sectional view of a modified form of drier.

The numeral 1 indicates a floor of the drier, which, in this instance, is the floor of the room in which the drier is located.

The drying chamber is formed by the side walls 2 and 3, the front wall 4, and the back wall 5. The end wall 2 has a door 6, and the wall 3 has the door 7. The doors are provided with suitable hinges 8 and latches 9.

At the bottom of the walls 2 and 3 there is an opening 10 in which is pivoted a slat 11 adapted to close the opening or partially open same, a screen 12 covers this opening at the back.

The drier is divided into two drying chambers A and B, by the partition 13 which may be hollow, as shown, or solid.

Horizontal guide strips 14 are fixed to the vertical posts 15 to receive sliding trays 16. Screens 17 are provided to cover the bottom of drying chambers A and B, and a similar screen 20 is provided to cover the tops of the chambers. These screens are readily removable, an enlarged section of the screen and frame is shown in Fig. 7.

Through the partition 13 is an opening 21 in which is mounted a blower 22 on the shaft 23, a bearing 24 supported by bracket 25, and a bearing 26 supported by the crossbar 27 are provided. The shaft 23 projects through the wall 3, and has a drive pulley fixed thereon, any suitable power may be used to drive the pulley.

The tray 16 consists of a frame 29, a screen 30 mounted thereon, and cleats 31 spacing the screen from the bottom; a cross bar 32 serves to strengthen the frame. A handle 33 is provided to pull the tray in or out.

The screen 17 and 20 has a frame 34 to which the screen is attached. Openings 34' and 35' communicate with the outside of the building by means of pipes 36', doors 37' and 38' connected to lever 39' which slides through the guide 40' to close one opening and open the other.

In operation the short lengths of macaroni are spread out in the trays and placed in the drier, then the blower is started and run at a speed to give a predetermined flow of air in the direction shown by the arrows, or in opposite direction when the blower is reversed.

The air is drawn down through the screens 20 and through the macaroni, and the screen 30 in the bottom of trays through the screens 17, through the blower and up through screens 17 in the other chamber, and up through tray screens and macaroni and out through screens 20.

In the modified form of drier shown in Fig. 8 space is left at the top of the drying chambers, and a blower placed therein which in effect is the same as turning the above described drier up side down, except that space should be allowed under the trays as shown. The drying chambers C and D are divided by the partition 35 in which a blower 36 is mounted. Screens 37 and 38 inclose the chambers, 39 are the trays, and 40 represent the space under the trays.

What I claim is as follows but modifications may be made in carrying out the invention shown in the drawings and in the above particularly described form thereof, within the purview of the invention:

In a drier of the class described, an enclosure forming a pair of drying chambers, a fan located in an opening in the partition between said two chambers to cause air to pass from one of said chambers to the other, an adjustable ventilator to allow air to pass into one or to escape from the other chamber adjacent the fan, a plurality of tray slides in the upper portions of both of said chambers, and a plurality of removable screen bottom trays in both of said chambers, whereby the air will pass downwardly through certain of said trays to the fan and upwardly through the other trays from the fan.

In testimony whereof I have hereunto set my hand this 30th day of March A. D. 1923.

GIOVANNI CAPPELLETTI.